No. 622,583. Patented Apr. 4, 1899.
J. K. YOUNG.
NUT LOCK.
(Application filed Dec. 9, 1898.)

(No Model.)

WITNESSES:
J. P. Appleman.
W. L. Bogan.

INVENTOR
John K. Young.
BY
N. E. Evert & Co.
ATTORNEYS.

THE NORRIS PETERS CO., PHOTO-LITHO., WASHINGTON, D. C.

UNITED STATES PATENT OFFICE.

JOHN K. YOUNG, OF CARNEGIE, PENNSYLVANIA.

NUT-LOCK.

SPECIFICATION forming part of Letters Patent No. 622,583, dated April 4, 1899.

Application filed December 9, 1898. Serial No. 698,704. (No model.)

*To all whom it may concern:*

Be it known that I, JOHN K. YOUNG, a citizen of the United States of America, residing at Carnegie, in the county of Allegheny and State of Pennsylvania, have invented certain new and useful Improvements in Nut-Locks, of which the following is a specification, reference being had therein to the accompanying drawings.

My invention relates to certain new and useful improvements in nut-locks.

The object of my invention is to provide simple and effective means for locking a nut upon a bolt so as to prevent it from becoming loosened accidentally or to allow of the removal of the nut after it has been once placed on the bolt.

This invention relates to nut-locking devices or arrangements for bolts in which the locking-pin is used to prevent the nut from becoming accidentally or improperly worked off the bolt. It is applicable to any purposes for use when such result is desired to be obtained, including railroad-bridges, wagons, and vehicles of different kinds, and for fastening fish-plates or rails on railroads.

Briefly described, my invention consists in a metal locking-pin having each end tapered, as shown, and which is adapted to operate in the slot formed on the inner face of a washer mounted on the securing-bolt, the respective ends of said pin being adapted to abut against the face of the object through which the bolt passes and against the inner face of the nut to prevent the displacement of the latter when it is in position on the bolt.

My invention finally consists in the novel combination and arrangement of parts hereinafter more fully described, and particularly pointed out in the claim.

In describing the invention in detail reference is had to the accompanying drawings, forming a part of this specification, wherein like numerals of reference indicate corresponding parts throughout the several views thereof, and in which—

Figure 1:
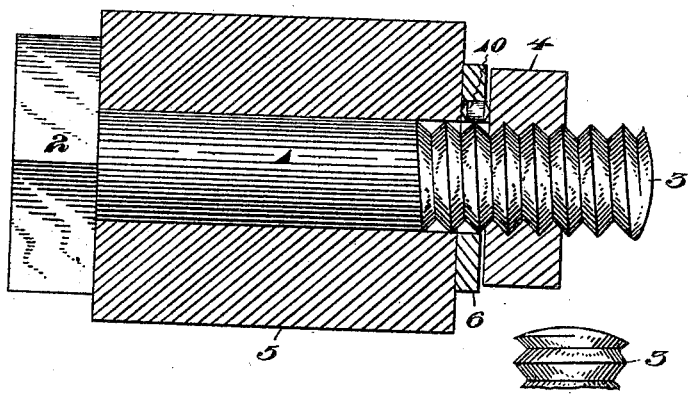
Figure 2:
Figure 2:
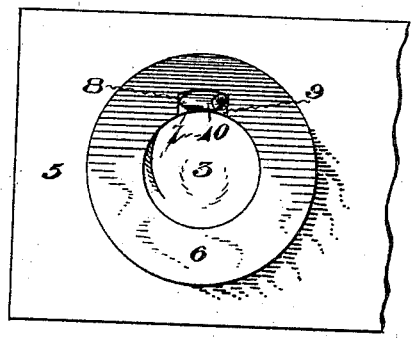
Figure 3:
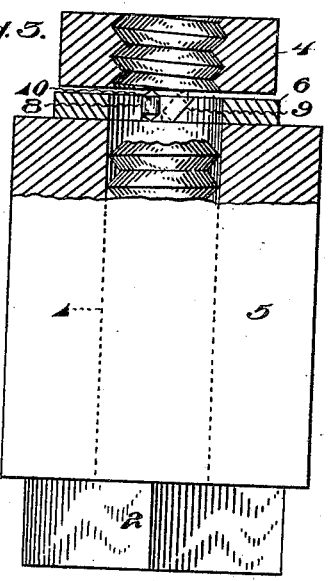
Figure 4:
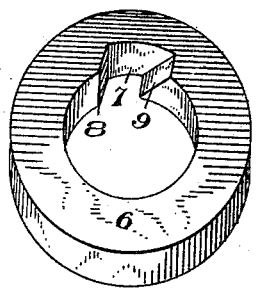
Figure 5:
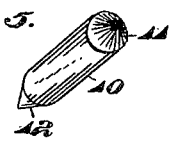

Figure 1 is a cross-sectional view of my improved device, showing the locking-pin in position securing the nut on the bolt. Fig. 2 is a side view showing the washer and locking-pin, the nut being removed. Fig. 3 is a top plan view, partly in section, the bolt being broken away in several places, showing in full lines the locking-pin in engagement with the nut and in dotted lines the locking-pin out of engagement with the nut. Fig. 4 is a perspective view of the washer, showing the recess formed therein in which the locking-pin operates. Fig. 5 is a perspective view of the locking-pin.

Referring to the drawings by reference-numerals, 1 indicates the bolt, having the head 2 and the screw-threads 3 formed on its inner end, upon which the nut 4 is adapted to engage.

5 indicates a piece of metal which is used for illustration to show the operation of my improved nut-lock.

6 indicates a washer having the recess 7 formed on its inner face, one of the sides thereof, as at 8, being vertical, as shown, and the opposite side, as at 9, inclined, as shown. This washer is adapted to be placed on the bolt between the inner edge of the piece of metal 5 and the nut 4.

10 indicates the locking-pin, which is adapted to operate in the recess 7 and the ends thereof being tapered, as at 11 12, as shown.

The operation of my improved nut-lock is as follows: The bolt is inserted through the piece of metal 5 and the washer mounted on the free end thereof. The locking-pin is then placed in the recess 7 and lies in position, as shown in dotted lines in Fig. 3, against the inclined side 9. The nut is then screwed on the bolt and brought into contact with the washer. When it is attempted to remove the nut, the inner face thereof will cause the locking-pin 12 to assume a vertical position, as shown in full lines in Fig. 3, and prevent the unscrewing of the nut. The nut may be readily tightened, however, as upon forward movement being imparted to the nut the locking-pin will be carried thereby into the inclined position shown in dotted lines in Fig. 3, but upon the reverse movement being imparted to the nut the pointed end of the pin is again engaged by the inner face of the nut and the pin returned to the position shown in full lines in this view and arresting further movement of the nut.

It will be noted that various changes may be made in the details of construction without departing from the general spirit of my invention.

Having thus fully described my invention, what I claim as new, and desire to secure by Letters Patent, is—

In a nut-lock, the combination with a bolt and its nut, of a washer adapted to be mounted on the bolt intermediate of the nut and the object to be locked, said washer being provided with a slot which is formed with a vertical and an inclined side, and a locking-pin fitting loosely within said slot with both of its ends tapered and being of greater length than the thickness of the washer whereby the same is engaged between the object to be locked and the base of the nut and carried against the vertical side of the slot by the backward movement of the nut, and is inclined against the inclined side of said slot to release the tapering ends of the pin from engagement by the forward movement of the nut, substantially as herein shown and described.

In testimony whereof I affix my signature in the presence of two witnesses.

JOHN K. YOUNG.

Witnesses:
 JOHN NOLAND,
 WILLIAM E. MINOR.